Nov. 2, 1954        E. W. SMITH        2,693,418
MEANS AND METHOD OF FILLING CANS WITH PRESSURIZED SUBSTANCES
Filed July 11, 1951
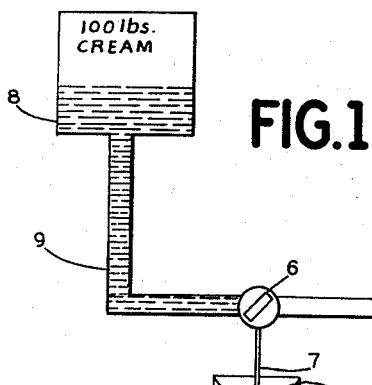
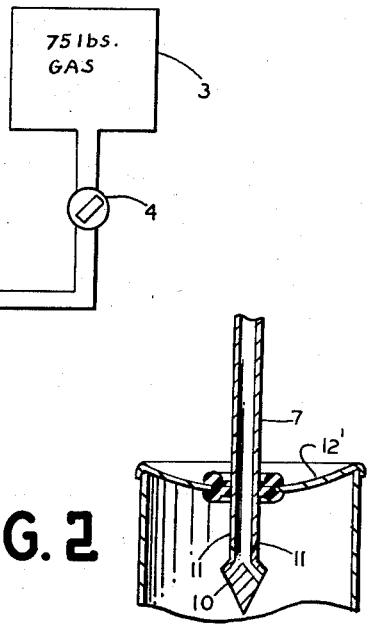
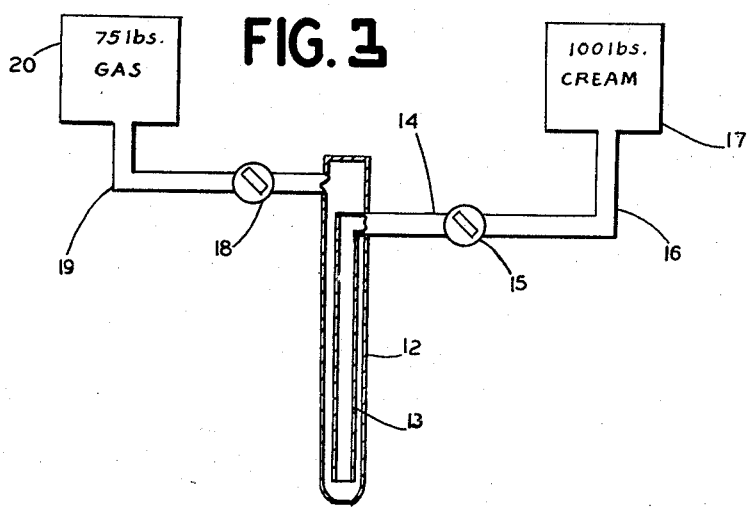
INVENTOR.
Edward W. Smith
BY Ezekiel Wolf
his Attorney

United States Patent Office 2,693,418
Patented Nov. 2, 1954

2,693,418

MEANS AND METHOD OF FILLING CANS WITH PRESSURIZED SUBSTANCES

Edward W. Smith, Melrose Highlands, Mass.

Application July 11, 1951, Serial No. 236,151

10 Claims. (Cl. 99—79)

The present invention relates to the field of packaged foamed products and more particularly to an improvement in the method and means for packaging such products which are dispensed in a foamed state as for instance whipped cream.

As is well known in the art, a commercially acceptable packaged whipped cream may be obtained by filling a suitable container with the desired amount of cream and then charging the container with a gas such as nitrous oxide, or a mixture of nitrous oxide and carbon dioxide gas under pressures of approximately 100 pounds per square inch.

More recently commercial interest has been attracted to the possibilities in the so-called single trip container for such packaging of whipped cream and other similar materials because of its greater applicability to home use. The single trip container which is perhaps best adapted to this purpose is an adaptation of the steel beer can coated on the inside with some suitable sanitary material such as wax and fitted with a rubber or plastic dispensing valve attached to the top, the latter being clinched to the top of the can with a proper gasket.

One procedure which has been used by those skilled in the art is to mix the pasteurized cream with sugar, a stabilizer, and such flavoring as may be desired, after which 7 or 8 ounces of this mix is then filled into the can and the gasketed metal top in which the valve has already been assembled is then clinched in place and the can passed to a gassing equipment for filling with the requisite amount of gas, or mixture of gasses, as may be desired. Following the gassing operation the container is subjected to a violent shaking operation for a period of 30 to 60 seconds to incorporate the gas into the cream since without it the absorption rate is extremely slow.

It will be noted from the above that such a procedure involves four steps, namely, filling, capping, gassing, and agitation. It will further be noted that the equipment required for such a series of operations is rather complicated, bulky, and expensive. Furthermore the fairly extensive period of agitation required, not only reduces the capacity of the production line but the agitation itself is a rather haphazard method of attaining the desired degree and uniformity of absorption of the gas. Not only is the cost of the equipment required for such packaging prohibitive to any but large plants but, in addition, the handling of separate cans and tops previous to the capping operation is not conducive to sanitary filling and further the dispensed product does not have the desired smoothness and texture.

It has been established that a thorough and uniform mixing of the cream or other fat containing mixture to be dispensed, with the gasses used is essential to a satisfactory product. Such intimate mixing of the gas with the liquid can best be obtained by arranging that the volume of liquid involved should present the maximum area to the gas as under these conditions the absorption is greatly facilitated. While violent shaking will in time succeed in achieving the desired absorption the increased liquid area presented to the gas by this means is relatively small and moreover requires elaborate machinery for supplying the agitation.

In the present invention not only are two of the above-mentioned four steps eliminated, insofar as the packager is concerned, i. e. the capping and agitation, but in addition the remaining two steps, i. e. the filling and gassing are in effect combined into one operation thereby materially reducing the time and equipment required. The method and means whereby these desirable improvements are accomplished can best be understood by the following description and the drawings attached hereto.

In the drawings, Figure 1 shows a system embodying the features of the present invention; Figure 2 shows a detail of the system shown in Figure 1; and Figure 3 shows a further modification of the system of Figure 1.

Referring to Figure 1, 1 is the container to be filled which has already been fitted with the necessary cap 20 and valve at the time the container is manufactured. The cap 20 may be flat or dished as shown to cause better dispersion, as will be explained later. The valve 2 is simply a known form of rubber grommet fitted in the cap and consisting of a short length of rubber tube containing a perforable self-sealing diaphragm and forms no part of the present invention.

The gas to be used in pressurizing the container passes from the tank 3, through a reducing valve 4, and pipe 5, to a two way valve 6. Leading from valve 6 is a special type of hypodermic needle 7 which will be described in more detail shortly and which is adapted to pierce the diaphragm in valve 2. A second tank 8 holds a supply of the cream or cream-like mixture to be used to fill the container 1 and leads through pipe 9 to the other entrance to the two way valve 6.

Turning now to Figure 2 which shows an enlarged view of the needle 7, it will be noted that it is fitted with a point 10 adapted to pierce the diaphragm of valve 2. It will also be noted that egress of the liquid from the needle is accomplished via holes 11 disposed around the periphery and that under pressure the liquid in emerging is thrown backward from the point 10 against the cap 12 of the can by which it is reflected down into the can.

The procedure of filling and gassing the container is as follows: The container to be filled is brought into position under needle 7 and the point 10 of the latter is forced through the rubber diaphragm in valve 2. Valve 6 is now turned to such a position that gas line 5 is connected to needle 7 thereby allowing gas to pass through needle 7 and fill the can with gas to the desired pressure, let us say 75 pounds per square inch. As soon as this pressure has been attained which occurs almost instantly the two way valve 6 may then be turned to its other position to connect needle 7 to pipe 9 and allow cream from tank 8, which has previously been pressurized to say 100 pounds per square inch, to flow to the needle. Since the pressure in tank 8 is higher than the gas pressure in the gas filled container in our illustration 100 pounds per square inch against 75 pounds per square inch, the difference, or 25 pounds per square inch is available to force the cream through needle 7 and out through openings 11 whence it is propelled at high velocity against the top and/or upper sides of the container 1 gradually filling it to the desired level. The flow of cream may then be cut off, needle 7 withdrawn from the container, and the package of cream is then ready for use without the necessity for any agitation.

By propelling the cream into the already pressurized container at high velocity the incoming cream is presented to the gas in the form of a thin film trickling to the bottom down the sides of the can, or if the velocity is high enough, in the form of shattered droplets so that the ratio of its area to its volume is enormously increased thereby creating a condition conducive to rapid gas absorption without the necessity for prolonged agitation which would otherwise be necessary.

While it might appear that filling a can with say 8 ounces of cream in this manner might be a slow process, this is not actually the case. Using a hypodermic needle with an outside diameter of .082 inch and with the two holes 11 having a diameter of .038 inch it has been found that it is easily possible to fill 8 ounces of cream into the can in 30 seconds. The total time required for the whole operation including gassing, filling, etc. need not exceed one minute. Thus with an array of ten needles operated simultaneously, as is easily possible, a capacity of 600 cans per hour is readily obtainable with a negligible amount of equipment.

Since one of the objects of the invention is to present as large as possible a surface area of the cream to the gas, an alternative method which may be used is to utilize a special type of needle such as is illustrated in Figure 3. In this case the needle consists of an outer tube 12 concentric with and surrounding a somewhat smaller tube 13 which is connected via tube 14, valve 15, and tube 16 to tank 17 holding a supply of the cream. Similarly the outer tube 12 is connected through reducing valve 18 and tube 19 to tank 20 containing the gas supply.

Using this method of filling, the needle is inserted into the interior of the can through the self sealing rubber diaphragm after which the gas and cream flow in simultaneously, the cream being drawn from the supply by the aspirator action of the gas flowing by the tip of tube 13. By proper adjustment of the rate of flow of each of the two components going into the container the attainment of the desired gas pressure in the can may be made coincident with the filling of the desired amount of cream.

Other types of needles may be used, the chief criterion being to disperse the particles in such a way that a large area is exposed to gas absorption so that the mixing is quick and thorough.

Having now described my invention, I claim:

1. A method of filling a can with pressurized cream for the production of whipped cream which comprises first filling the can with gas compatible with the cream for the whipping thereof to a pressure of about seventy-five (75) pounds per square inch, then forcing into the can, in a thin stream dispensible in droplets, the cream under a pressure of about one hundred (100) pounds per square inch until the amount necessary to substantially fill the can has been forced therein and then withdrawing said higher pressure and then closing a sealing closure to seal the can through the opening where the stream enters.

2. A method of filling a can having a self sealing closure with pressurized substances foamable upon dispensing therefrom which comprises first filling the can through the closure with gas to a pressure substantially above atmospheric pressure, then forcing the substance to be dispensed in a thin stream presenting a large area to said gas into the can through the closure until the amount necessary to substantially fill the can has been forced therein.

3. A system for filling an enclosed can having a self sealing valve with gas and cream or the like under pressure, comprising separate sources of gas and cream, means for causing the gas to flow into the can through the self sealing valve to build up a pressure therein above atmospheric and means for changing the flow to cause the cream to flow into the can under the pressure built up therein, both said means including a hollow needle piercing the self sealing valve through which said gas and cream flow.

4. In a system for filling an enclosed can having a self sealing valve with gas and cream or the like under pressure, a line of flow for the gas and cream, comprising a hypodermic needle having a closed pointed end and a plurality of side outlets just behind the closed end, said outlets being directed outwards and backwards of the shank of this needle.

5. In a system for filling an enclosed can having a self sealing valve with gas and cream or the like under pressure, a hypodermic needle piercing the self sealing valve and extending into the can, said hypodermic needle having a closed with outlet openings just behind the closed end having means providing directed passages with outlets directed upwards and outwards against the inside top of the can whereby the cream particles will become dispersed in the gas.

6. A system for filling an enclosed can having a self sealing valve with gas and cream or the like under pressure, comprising separate sources of gas and cream, means for aspirating the cream into the can while applying gas pressure including a hypodermic needle having a passage for the flow of cream and a passage for the flow of gas adjacent thereto to draw the cream into the can conduit means for connecting the passages of said needle to said sources, and means for separately regulating the flow of the gas and cream.

7. In a system for filling an enclosed can having a self sealing valve with gas and cream or the like under pressure, a hypodermic needle piercing the self sealing valve and extending into the can, said hypodermic needle having a passage for the flow of cream with an outlet and an adjacent passage for the flow gas extending across the cream outlet for drawing the cream through said outlet and a second outlet for the flow of both gas and cream mixed having an aspirating reduction at said outlet.

8. In a system for filling an enclosed can having a self sealing valve with gas and cream or the like under pressure, said can a hypodermic needle piercing the self sealing valve and extending into the can, said hypodermic needle having a closed with outlet openings just behind the closed end having means providing directed passages with outlets directed upwards and outwards against the inside top of the can whereby the cream particles will become dispersed in the gas, said top of the can having a convex surface of the inside.

9. A method of filling a container with liquid under pressure which comprises first sealing the container with an air seal then inserting a needle through the seal and forcing into the container under pressure above atmospheric the gas to a substantial pressure and then forcing into the container through the same passage, the liquid under a higher pressure than the pressure in the container until an amount necessary to substantially fill the container of liquid has been forced into the container and thereafter withdrawing the needle thus permitting the seal to seal itself.

10. A method of filling a container having a self sealing closure therefor with liquid which is already filled with gas to a substantial pressure above atmospheric which comprises forcing into the container through said closure in a thin stream dispersible in droplets, the liquid under a higher pressure than the gas until an amount of liquid sufficient to substantially fill the container has been forced into the container.

References Cited in the file of this patent

UNITED STATES PATENTS

| Number | Name | Date |
|---|---|---|
| 1,769,941 | Bre Miller | July 8, 1930 |
| 2,064,815 | Armstrong | Dec. 22, 1936 |
| 2,494,454 | Ritchie | Jan. 10, 1950 |
| 2,518,064 | Rapisarda | Aug. 8, 1950 |
| 2,584,397 | Pitman | Feb. 5, 1952 |
| 2,613,023 | Reich | Oct. 7, 1952 |

OTHER REFERENCES

A course in General Chemistry, by McPherson and Henderson, copyright 1913–1915, page 256 only. (Copy in Div. 35.)